Dec. 16, 1947. A. O. JÖRGENSEN 2,432,573
SELF-STARTING SINGLE-PHASE MOTOR
Filed Nov. 29, 1943
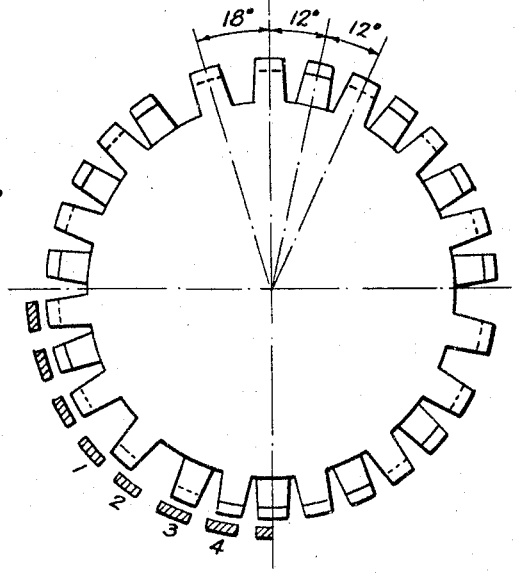
Fig. 1.
Fig. 2.
Fig. 3.
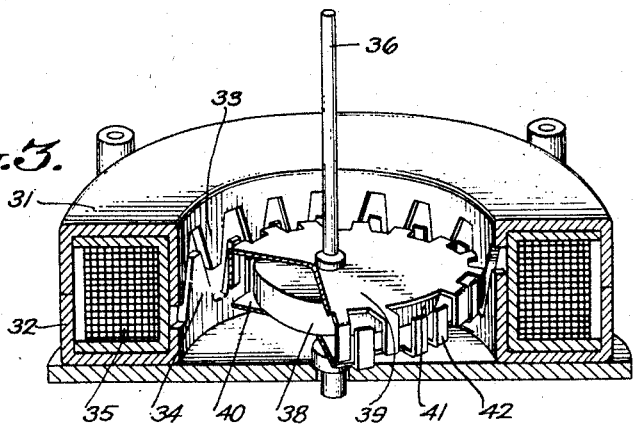
Inventor,
A. O. JÖRGENSEN.
By, Attorneys.

Patented Dec. 16, 1947

2,432,573

UNITED STATES PATENT OFFICE 2,432,573

SELF-STARTING SINGLE-PHASE MOTOR

Anders Ossian Jörgensen, Stockholm, Sweden, assignor to Telefonaktiebolaget L. M. Ericsson, Stockholm, Sweden, a company of Sweden Application November 29, 1943, Serial No. 512,226
In Sweden January 1, 1942

1 Claim. (Cl. 172—275)

This invention relates to an automatic starting of single-phase synchronous motors and particularly to an arrangement for a vibration start of such motors of the kind equipped with a multi-polar permanent-magnet rotor without windings and with pole pieces of soft-iron and a wired stator. A reliable start of such a motor can be effected only by certain means, since the rotor can adjust itself to obtain a magnetically symmetrical position. If A. C. is connected to the stator winding at such a neutral position the starting torque will be zero. As a rule, however, the rotor is somewhat displaced from the neutral position, and it can thus be actuated by changing forces. These may set the rotor into successively increasing vibrations until it will be caught by the synchronism in one or other direction. In the least favourable position the starting torque is very small. The object of the present invention is to produce a determining starting torque of smallest size which is considerably greater than the starting torque in known constructions. With this and other objects in view, an arrangement in accordance with the present invention for the automatic starting of single-phase synchronous motors of the kind referred to is characterized by displacement of a given number of either rotor or stator poles by nearly half a pole division in the same direction. Preferably about ten per cent of the rotor poles are so displaced, a corresponding proportion of said poles being removed.

The invention is illustrated on an attached drawing. Fig. 1 is a diagrammatic view in cross section of the rotor poles and some of the stator poles. Fig. 2 shows a detail of Fig. 1. Fig. 3 is a perspective view in section showing the invention applied to a motor.

In the embodiment shown in Fig. 1 it is assumed that the stator has 30 poles, one fourth of which is indicated in the lower left-hand square. The rotor is a multipolar permanent-magnet rotor with soft-iron pole pieces. The pole division of 12° is, over most of the rotor, the same as in the stator, and poles contiguous to each other have the opposite polarity. Three poles at a distance from each other of 120° are displaced by half a pole division clockwise, whereas three poles of opposite polarity have been removed to allow for the three displaced poles. Consequently, 24 poles remain intact, and three are displaced by 6° so that they are situated 18° from the next adjacent poles, as shown in Fig. 1. The relation between the position of the rotor pieces and the stator pieces is seen from Fig. 1 and the detail in Fig. 2, wherein R represents the rotor and S the stator. The enumeration of the stator poles is identical in Figs. 1 and 2 for corresponding poles.

The motor shown in detail in Fig. 3 consists of two identical stator halves 31 and 32 with pole extensions 33 and 34 respectively, which are symmetrically arranged around the periphery. The stator halves encircle a coil 35. When the coil is energized with alternating current the pole extensions become north pole and south pole alternately. The rotor shaft 36 supports the rotor 37 which is formed by a symmetrical permanent magnet 38 encircled by two soft-iron plates 39, 40 in which the pole extensions have been cut, as shown in the figure. The permanent magnet is magnetised in the direction of the shaft, causing one pole plate to be north pole and the other south pole. Thus the rotor is polarised. At the point 41 a rotor tooth is removed and 42 is one of the teeth which have been displaced by half a pole division, as described in detail in the foregoing.

For a synchronous motor with polarized D. C. flow the following equation is obtained for a cooperating stator and rotor pole at a certain moment:

$$M_h = -K i_0 \sin \varphi \sin \omega t$$

wherein $M_h$ represents the torque $i_0$ the maximum value of the current in the A. C. winding, $\varphi$ the angular distance from the centre of the stator pole to the centre of the rotor pole (measured in electric degrees), $\omega$ the frequency of the stator current, and $K$ a factor, in which the ampere turns of the permanent flow and the conductivity of the magnetic circuit, at the angle $\varphi=0$, i. e., when the poles are opposite each other, serve as factors.

Since $M_h$ and $\varphi$ both count as positive counter-clockwise, it is obvious that for $\omega t<180°$ and $\varphi<180°$ the state of equilibrium of the rotor is stable, the rotor and stator flow having the same direction. By a suitable construction of the pole pieces and, when $\varphi$ is zero or near zero and $\omega t<180°$, saturation occurs when $/I/<\frac{1}{3}i_0$, i. e., the value of $K$ decreases rapidly at $I>\frac{1}{3}i_0$. Should, however, $\varphi=90°$, saturation is not achieved until $/I/=\frac{3}{4}i_0$, e. g. the value of $K$ decreases only when $/I/>\frac{3}{4}i_0$.

Considering the above-mentioned conditions, the torque of the 24 non-displaced poles $M_I=-24K_1 i_0 \sin \omega t \sin \varphi$, and of the remaining $M_{II}=-3K_2 i_0 \sin \omega t \sin (\varphi-90°)$. $K_1$ and $K_2$, as is seen from the following, on certain occasions, obtain different values.

The total torque is $$M_{tot}=24K_1 i_0 \sin \omega t \sin \varphi - 3K_2 i_0 \sin \omega t \sin (\varphi-90°)$$

$$=-i_0 \sin \omega t /24K_1 \sin \varphi + 3K_2 \sin (\varphi-90°)$$

$$=-i_0 \sin \omega t \sin (\varphi-\alpha)\sqrt{(24K_1)^2+(3K_2)^2}$$

where $$tg\alpha = \frac{1}{8}\frac{K_2}{K_1}$$

In the initial position, on account of the permanent flow, $\varphi=0$. Since the motor, as a rule, must be able to start at an arbitrary time, it may occur that the current, which in continuous condition is $i_0 \sin \omega t$, is connected when $t=0$. During the time that $\omega t<180°$ the equation proves that the rotor is pulled to the position where $\varphi-\alpha=0$, e. g. $\varphi=\alpha$. If now $\alpha$ were a constant independent of the current, the rotor would have a state of equilibrium in which the torque permanently would be zero. In such a case starting would fail entirely.

Now, according to the invention, it is arranged so that the magnetic conductivity decreases owing to saturation in the rotor poles on certain occasions. Thereby, $K_1$ and $K_2$, in which the conductivity serves as factor, are reduced.

At $0°<\omega t<90°$ and $\varphi-\alpha$ the non-displaced rotor poles lie nearly opposite the stator poles, while the displaced poles lie opposite the pole gaps of the stator. The non-displaced poles have a polarity converse to the stator poles opposite.

At increasing current I the non-displaced poles are traversed by a higher flow than the displaced ones. Saturation follows earlier in the former poles, thus causing a speedier reduction of $K_1$ than of $K_2$. The angle $\alpha$, determined by $$t_g\alpha = \frac{1}{8}\frac{K_2}{K_1}$$

increases and the armature is moved to a position corresponding to the new value of the angle $\alpha$.

At $90<\omega t<180°$, where the current decreases, $K_1$ increases at a quicker rate than $K_2$, causing the angle $\alpha$ to decrease and the rotor to move backwardly.

At $180°<\omega t<360°$ the rotor equilibrium is unstable. The opposite stator poles and the non-displaced rotor poles have converse polarity. The flow through each such rotor pole then decreases more than the flow through the displaced poles which lie nearly opposite the stator pole gaps and saturation follows earlier in the latter ones. At $180°<\omega t<270°$, $K_2$ decreases at a quicker rate than $K_1$. The angle decreases and the rotor continues to move backwardly. When finally $270°<\omega t<360°$, $K_2$ increases quicker than $K_1$, the angle $\alpha$ increases again and the rotor is moved forwardly.

The rotor moves keeping pace with the current fluctuations and is set in increasing oscillation. When the oscillation amplitudes have reached a sufficient size the rotor is caught by the synchronism in one or other direction.

The above described switching process is the least favourable for the starting, all other phases producing a better start.

With an increase in the relative number of displaced poles the operation of the rotor in synchronism deteriorates. The relation $\frac{1}{8}$ has, on test, offered a favorable operation and a suitable starting torque in the value of about $\frac{1}{8}$ of the synchronous moment.

A displacement of the teeth by more or less than 90° gives lesser difference in $K_2$ and $K_1$; at 45° the effect is unimportant, thus 90° is the most advantageous.

In the example now described it has been presumed that certain rotor poles are displaced. Naturally, similar results will be obtained, if instead, certain stator poles are displaced by a corresponding number of degrees.

I claim:

An arrangement for an automatic start of single-phase synchronous motors comprising a multipolar permanent-magnet rotor with a group of soft iron pole pieces, and a wired stator with a group of pole pieces, about ten percent of the pole pieces of one group being displaced with relation to the remaining pole pieces of this group by nearly half of a pole division all in the same direction whereby the pole pieces are so constructed that the neutral position of the rotor is changed at the start with the instantaneous value of the current.

ANDERS OSSIAN JÖRGENSEN.

REFERENCES CITED

The following references are of record in the file of this patent:

UNITED STATES PATENTS

| Number | Name | Date |
|---|---|---|
| 1,967,782 | Putnam | July 24, 1934 |
| 2,081,993 | Gebhardt et al. | June 1, 1937 |
| 2,122,307 | Welch | June 28, 1938 |
| 2,151,996 | Spahn | Mar. 28, 1939 |
| 2,212,192 | Howell | Aug. 20, 1940 |
| 2,295,286 | Michelsen | Sept. 8, 1942 |

FOREIGN PATENTS

| Number | Country | Date |
|---|---|---|
| 388,739 | Great Britain | Feb. 28, 1933 |
| 427,002 | Great Britain | Apr. 12, 1935 |
| 601,052 | Germany | Aug. 7, 1934 |